US009695828B2

(12) United States Patent
Helmenstein

(10) Patent No.: US 9,695,828 B2
(45) Date of Patent: Jul. 4, 2017

(54) AIR DELIVERY DEVICE

(71) Applicant: W.E.T. Automotive Systems AG, Odelzhausen (DE)

(72) Inventor: Winfried Helmenstein, München (DE)

(73) Assignee: GENTHERM GMBH, Odelzhausen (DE)

( * ) Notice: Subject to any disclaimer, the term of this patent is extended or adjusted under 35 U.S.C. 154(b) by 807 days.

(21) Appl. No.: 13/948,759

(22) Filed: Jul. 23, 2013

(65) Prior Publication Data
US 2014/0030082 A1 Jan. 30, 2014

(30) Foreign Application Priority Data

Jul. 25, 2012 (DE) .................. 10 2012 014 680
Jan. 10, 2013 (DE) .................. 10 2013 000 231
Jul. 19, 2013 (DE) .................. 10 2013 012 034

(51) Int. Cl.
B60H 1/00 (2006.01)
F04D 17/16 (2006.01)
F04D 29/42 (2006.01)
F04D 29/44 (2006.01)
B60N 2/56 (2006.01)

(52) U.S. Cl.
CPC ......... F04D 17/16 (2013.01); B60H 1/00471 (2013.01); B60N 2/565 (2013.01); B60N 2/5657 (2013.01); F04D 29/4226 (2013.01); F04D 29/441 (2013.01)

(58) Field of Classification Search
CPC .... B60N 2/5642; B60N 2/565; B60N 2/5657; F04D 17/16

USPC ........................................................ 454/120
See application file for complete search history.

(56) References Cited

U.S. PATENT DOCUMENTS

| 1,370,832 | A | 3/1921 | Mollberg |
| 1,439,681 | A | 12/1922 | Alkire et al. |
| 1,514,329 | A | 11/1924 | Metcalf |
| 2,022,959 | A | 12/1935 | Gordon |
| 2,158,801 | A | 5/1939 | Petterson |
| 2,703,134 | A | 3/1955 | Mossor |
| 2,758,532 | A | 8/1956 | Awe |
| 2,791,956 | A | 5/1957 | Guest |

(Continued)

FOREIGN PATENT DOCUMENTS

| DE | 37 05 756 | 10/1988 |
| DE | 10144839 | 3/2003 |

(Continued)

OTHER PUBLICATIONS

Excerpt from website http://www.seatcomfort.com/ventilation.htm, Specializing in Seat Ventilation and Heating Systems, Ventilation.

(Continued)

Primary Examiner — Steven B McAllister
Assistant Examiner — Jonathan Cotov
(74) Attorney, Agent, or Firm — The Dobrusin Law Firm, P.C.; Daniel P. Aleksynas

(57) ABSTRACT

The present invention concerns an air delivery device with an impeller mounted rotationally about the axis of rotation, designed for essentially axial intake of air and essentially radial expulsion of air relative to the axis of rotation, and which is arranged in a housing that has at least one intake opening and at least one blowing opening.

19 Claims, 3 Drawing Sheets

(56) References Cited

U.S. PATENT DOCUMENTS

Figure 1:
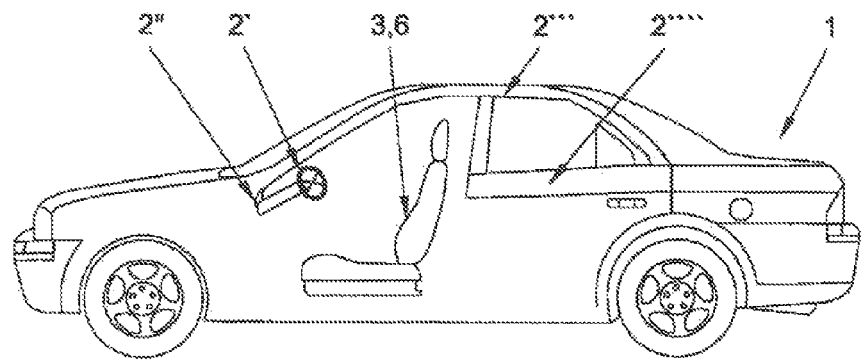

| | | | |
|---|---|---|---|
| 2,826,135 A | 3/1958 | Benzick | |
| 2,992,604 A | 7/1961 | Trotman et al. | |
| 2,992,605 A | 7/1961 | Trotman et al. | |
| 3,030,145 A | 4/1962 | Kottemann | |
| 3,101,037 A | 8/1963 | Taylor | |
| 3,101,660 A | 8/1963 | Taylor | |
| 3,127,931 A | 4/1964 | Johnson | |
| 3,131,967 A | 5/1964 | Spaulding | |
| 3,162,489 A | 12/1964 | Trotman | |
| 3,529,310 A | 9/1970 | Olmo | |
| 3,653,590 A | 4/1972 | Elsea | |
| 3,684,170 A | 8/1972 | Roof | |
| 4,043,544 A * | 8/1977 | Ismer | A47C 7/20 267/145 |
| 4,072,344 A | 2/1978 | Li | |
| 4,509,792 A | 4/1985 | Wang | |
| 4,589,656 A | 5/1986 | Baldwin | |
| 4,777,802 A | 10/1988 | Feher | |
| 5,160,517 A | 11/1992 | Hicks et al. | |
| 6,048,024 A * | 4/2000 | Wallman | A47C 7/74 297/180.14 |
| 6,059,018 A * | 5/2000 | Yoshinori | B60H 1/00285 165/41 |
| 6,068,332 A | 5/2000 | Faust et al. | |
| 6,164,719 A | 12/2000 | Rauh | |
| 6,179,706 B1 * | 1/2001 | Yoshinori | B60N 2/5635 297/180.14 |
| 6,478,369 B1 * | 11/2002 | Aoki | B60H 1/00271 297/180.1 |
| 6,685,553 B2 * | 2/2004 | Aoki | B60N 2/5635 297/180.14 |
| 6,758,741 B2 * | 7/2004 | Aoki | B60H 1/00285 297/180.14 |
| 6,929,322 B2 * | 8/2005 | Aoki | B60H 1/00285 297/180.13 |
| 7,201,441 B2 * | 4/2007 | Stoewe | B60N 2/5657 297/180.1 |
| 7,275,984 B2 * | 10/2007 | Aoki | B60N 2/5628 297/180.1 |
| 7,475,938 B2 * | 1/2009 | Stoewe | B60N 2/5657 297/180.1 |
| 8,360,517 B2 * | 1/2013 | Lazanja | B60N 2/5635 297/180.12 |
| 2002/0092308 A1 * | 7/2002 | Bell | B60H 1/00471 62/3.7 |
| 2002/0150478 A1 * | 10/2002 | Aoki | B60H 1/00457 417/44.1 |
| 2004/0139754 A1 * | 7/2004 | Kamiya | B60N 2/0244 62/186 |
| 2005/0067862 A1 | 3/2005 | Iqbal et al. | |
| 2005/0093347 A1 | 5/2005 | Bajic et al. | |
| 2006/0138810 A1 | 6/2006 | Knoll et al. | |
| 2007/0101729 A1 * | 5/2007 | Aoki | B60H 1/00285 62/3.61 |
| 2007/0176470 A1 * | 8/2007 | Stoewe | B60N 2/5657 297/180.13 |
| 2009/0227194 A1 * | 9/2009 | Johnston | B60H 1/00685 454/152 |
| 2010/0327637 A1 | 12/2010 | Bajic et al. | |
| 2012/0129439 A1 * | 5/2012 | Ota | B60H 1/242 454/120 |

FOREIGN PATENT DOCUMENTS

| | | |
|---|---|---|
| EP | 0 280 213 | 8/1988 |
| EP | 1266794 | 12/2002 |
| EP | 1323573 | 7/2003 |
| WO | 96/05475 | 2/1996 |
| WO | 02/053410 | 7/2002 |
| WO | 2005/021320 | 3/2005 |

OTHER PUBLICATIONS

GMT 830 Heating & Ventilation System, IGB Automotive Ltd., received by Assignee W.E.T. Automotive Systems, Jun. 2003.
Specializing in Seat Ventilation and Heating Systems, Seat Comfort Systems, http://www.seatcomfort.comsemashow1.htm, Jun. 10, 2003.

* cited by examiner

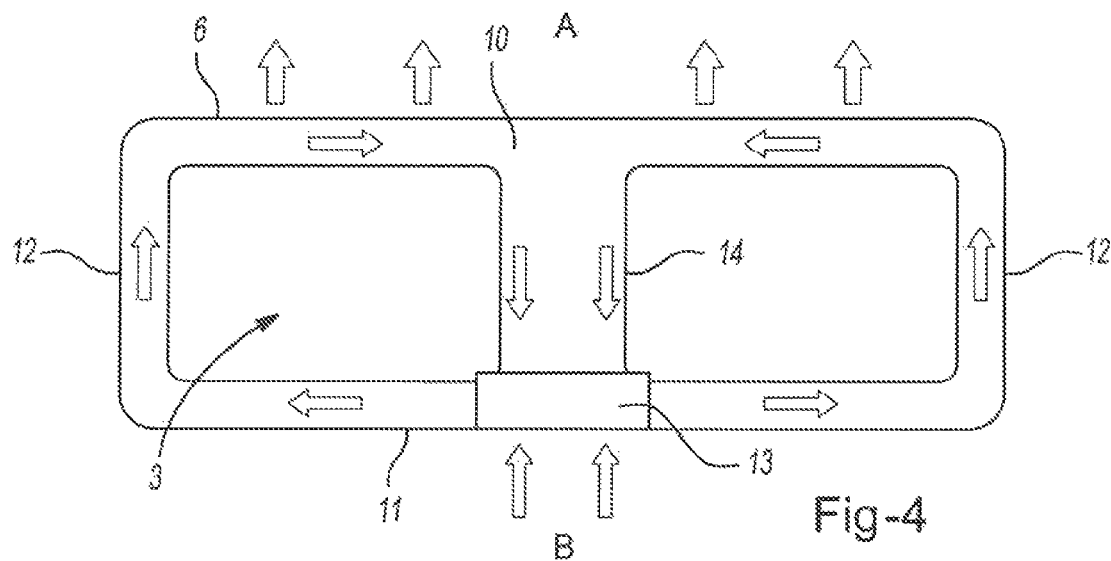
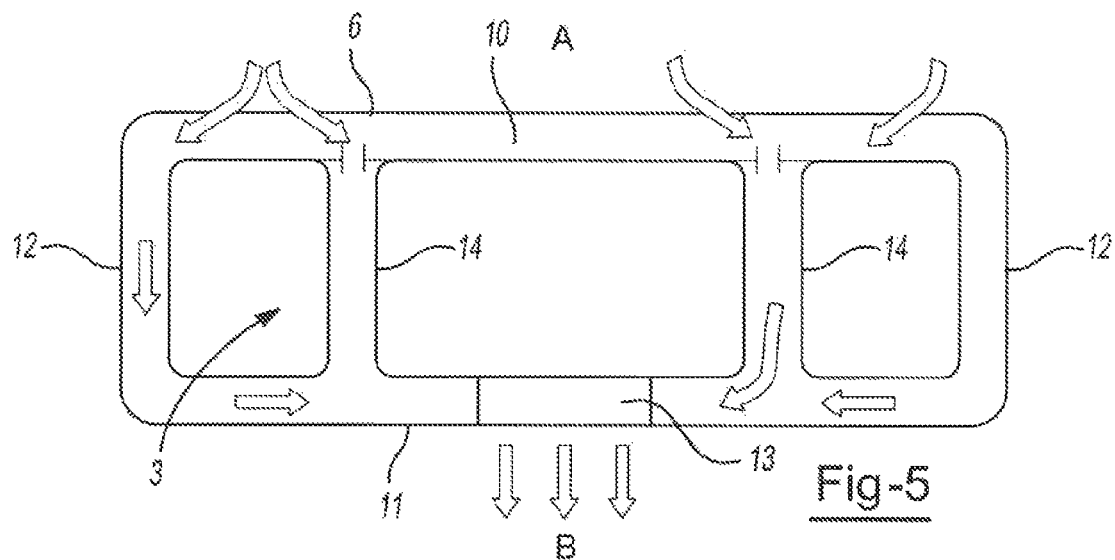
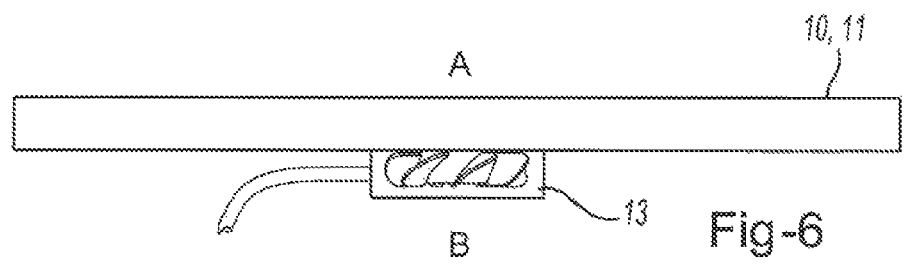

AIR DELIVERY DEVICE

BACKGROUND OF THE INVENTION

One subject of the present invention is an air delivery device with an impeller.

Prior Art

It is known how to use axial or radial fans for air delivery devices for the fans of seats. Axial fans, however, can only build up a limited pressure difference. Radial fans, in turn, have only limited use due to their design. It is therefore desirable to provide air delivery devices with high performance and diversified integration capability, especially in vehicle seats.

SUMMARY

The present teachings provide: an air delivery device with an impeller mounted able to rotate about the axis of rotation, being designed for essentially axial intake of air and essentially radial expulsion of air relative to the axis of rotation, and which is arranged in a housing that has at least one intake opening and at least one blowing opening. The present teachings provide: an air conditioner including one or more air delivery devices of the teachings herein.

The present teachings provide a seat with an air delivery device of the teachings herein and/or an air conditioner of the teachings herein. The present teachings provide a vehicle with an air delivery device, an air conditioner, or a seat, or the teachings herein.

FIGURES

In what follows, details of the invention will be explained in the specification and the claims. However, these remarks are only in the nature of examples. In the context of the claims, features can also be omitted, modified, amplified, or several embodiments can be combined. When a feature is to be fulfilled at least partly, this includes that the feature is also entirely or essentially entirely fulfilled. What is critical is that the desired benefit be achieved to a recognizable degree, for example, the feature is at least 50%, 90%, 95% or 99% fulfilled. Minimum amounts indicated may be surpassed. What is specified for an object can also apply to some or all of other similar objects. If not excluded, intervals also contain their end points.

Reference shall be made below to

FIG. 1 Motor vehicle with air conditioned seat in partial longitudinal section

Figure 2:
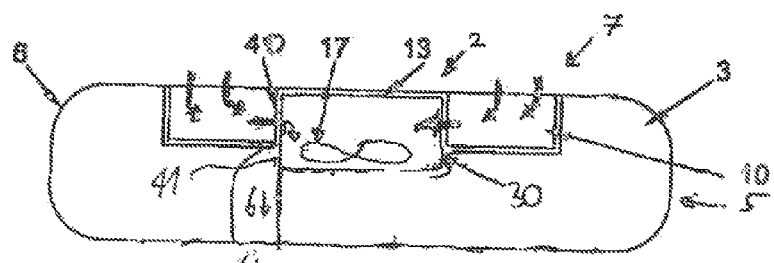
Figure 3A:
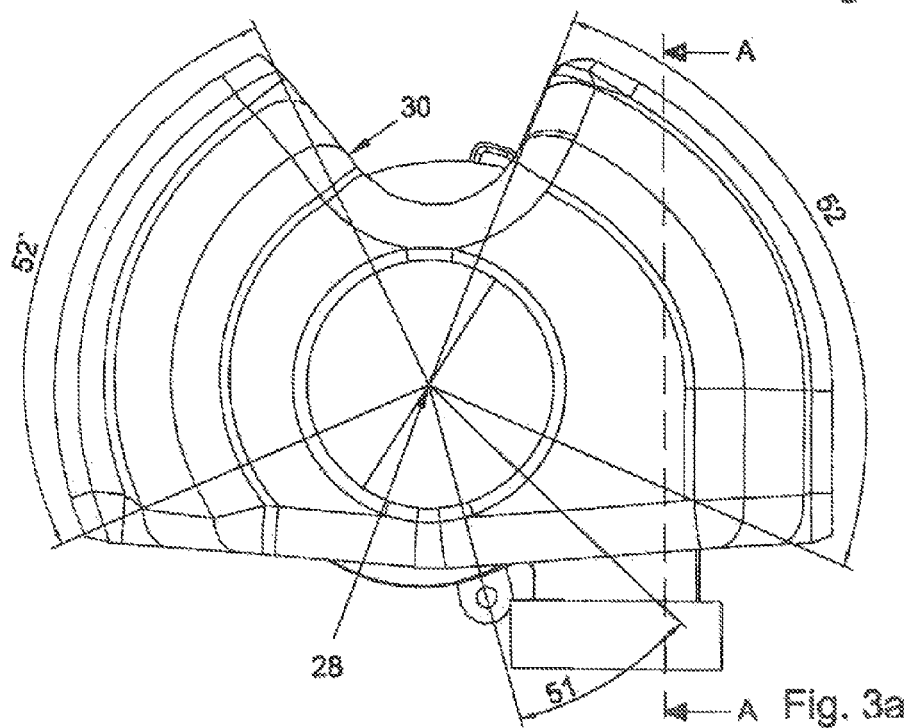
Figure 3B:
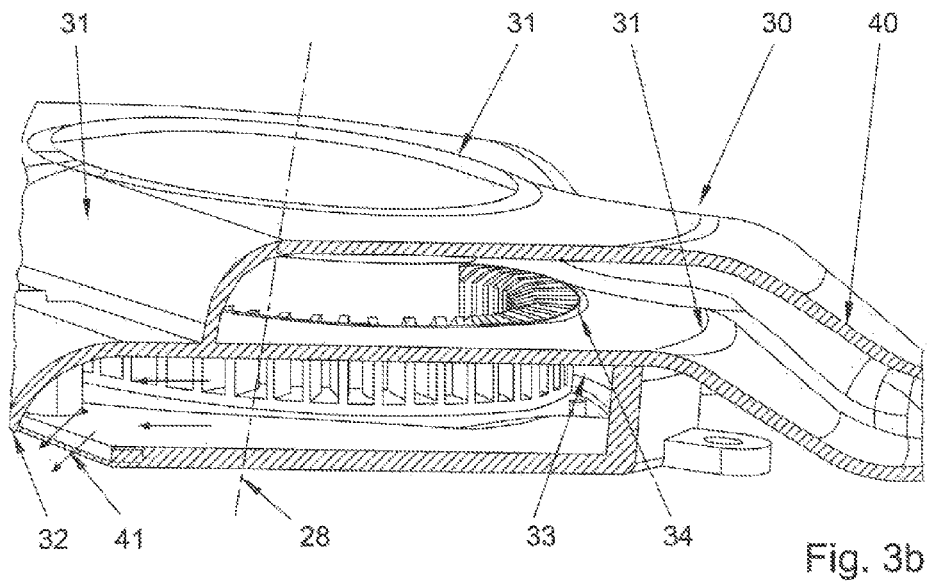
Figure 3C:
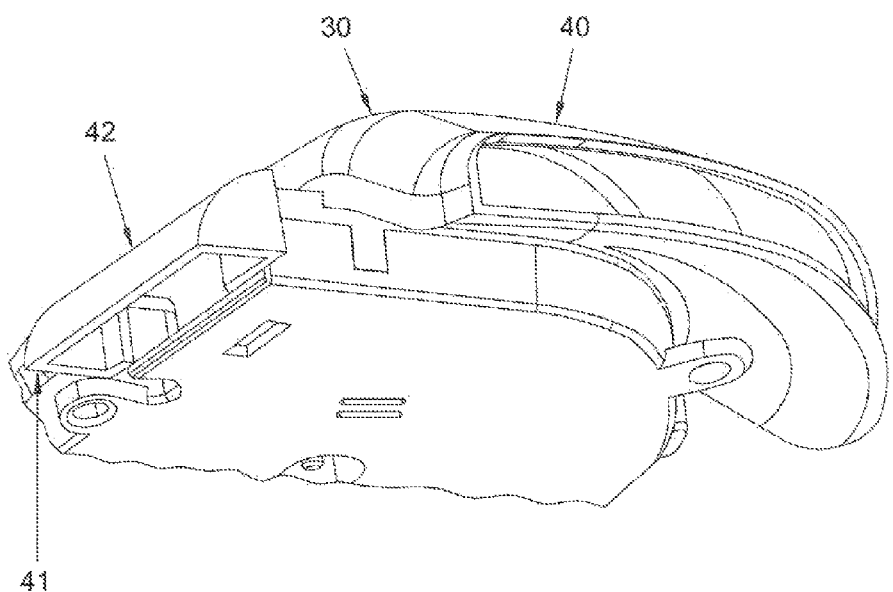

FIG. 2 Seat cushion of the motor vehicle of FIG. 1 with air conditioner in longitudinal section FIG. 3a Top view of a top side of an air delivery device of an air conditioner of FIG. 2 along the axis of rotation of an impeller (not visible) at its intake side, concealed by a housing FIG. 3b Section through a housing of an air delivery device of FIG. 3a along line A-A FIG. 3c Perspective view of an air delivery device of FIG. 3a from the side, looking at the underside of the air delivery device opposite the surface shown in FIG. 3a FIG. 4 Alternative second embodiment of a seat cushion of the seat of FIG. 1 in longitudinal section FIG. 5 Alternative third embodiment of a seat cushion of the seat of FIG. 1 in longitudinal section FIG. 6 Air delivery device with air directing layer in modular design

SPECIFICATION OF THE INVENTION

The present application claims priority to German patent application nos. DE102012014680.9, filed on Jul. 25, 2012 and DE102013000231.1 filed on Jan. 10, 2013 both of which are expressly incorporated by reference herein for all purposes.

The present invention concerns at least one vehicle 1. The term "vehicle" means, in particular, a mechanism for transporting of people and/or goods. For example, land, water, rail and air vehicles are conceivable, especially airplanes, ships and automobiles.

The invention furthermore pertains to at least one climate control system 2. The term "climate control system" means, in particular, an object that is to be influenced in regard to at least one climate parameter, i.e., is subject to a control and/or regulation, especially to bring it at least briefly to a certain setpoint or in a nominal range and/or keep it there permanently. This holds especially for those parts of a surface with which a medium can come into contact by design or with which a user can come into contact at least potentially when making use of the object. The term "control system" means in particular an object that is subject to a control and/or regulation at least in regard to one quantity. The term "climate parameter" refers especially to a climate quantity, such as temperature, humidity, air composition and/or flow rate. Coming under consideration are air conditioned seats, steering wheel, seat surfaces, furnishings, cladding elements of passenger compartments, supply tanks, fuel lines, or housings of batteries, engines, or other functional elements.

Advisedly, one climate control system 2 has at least one cushion 3. The term "cushion" encompasses, in particular, a device for dampening of impacts and/or for distributing local pressure peaks over a larger area. As an example, one can mention blocks of foam polyurethane. This enables a soft supporting of a user.

Favorably, an interior appointment 5 has at least one upholstery 6. The term "upholstery" means, in particular, a sheet form that is arranged at least partly on the surface of an object. For example, layers permeable and impermeable to air that contain perforated or unperforated leather and/or textile and that are arranged on a cushion, or hides that upholster at least part of a surface of a foam material are conceivable.

Another object of the present invention is at least one air conditioner 7. The term "air conditioner" means, in particular, an object that is suited to influence a climate control system at least in regard to at least one climate parameter, especially to bring it at least temporarily up to a certain setpoint or in a nominal range and/or to keep it there permanently. The purpose of this is, for example, a temperature control, humidification or dehumidification, and/or climate control of a user even during a lengthy stay in the vicinity of the control system. The temperature or climate control of a seat during lengthy car trips is conceivable, for example.

Advantageously, an air conditioner 7 has at least one ventilation device 8. The term "ventilation device" refers in particular to a device that can be used for the specific changing of the air composition or the air flow in a particular surface or space region, for example, a vehicle air conditioner, at least partly air-permeable spacer media, spacer textiles and/or air conditioning inserts; and which take the air delivered in particular from at least one air delivery device to at least one air exchange device or in the opposite direction.

Advantageously, a ventilation device 8 has at least one air delivery device 13. The term "air delivery device" refers in particular to a device for delivering air. In particular, flow machines like radial fans are conceivable. Advisedly, this is an air delivery device 13 with an impeller 17 mounted rotationally about an axis of rotation 28. The term "impeller" means in particular a wheel fitted with a plurality of vanes in the form of a wreath. It is designed for essentially axial intake of air and essentially radial expulsion of air relative to the axis of rotation. Axial intake means here a filling of the impeller with air that flows preferably for the most part along the axis of rotation of the impeller into the impeller, its working space, or the air inlet opening of the fan. Radial expulsion refers to an air outlet from the impeller for the most part in a direction radial to the axis of rotation of the impeller, preferably in the plane of the impeller. It is arranged in a housing 30. Preferably at least one intake opening 40 for admitting an air flow into the housing 30 and at least one blowing opening 41 for blowing out an air flow from the housing 30 are provided in the housing 30.

Advantageously, at least one air delivery device 13 has at least partially a position that enables an efficient collection of air within a single plane, for example, from regions of an air directing device 10 at a distance from all edges of a ventilation layer, especially at its midpoint. This prevents energy losses resulting from change of direction of the air, e.g., when supplying air from a horizontal collecting layer to a conventional vertical intake shaft.

Advisedly, at least one air delivery device 13 has a position enabling it preserving of the cushion comfort. As an example, one can mention regions of a comfort object at a distance from the user, especially in or underneath the cushion. Due to its special shape, however, the air delivery device 13 can also be arranged very close beneath the upholstery 6, without disturbing it.

If the impeller 17 has an air expulsion direction that has at least one directional component in or parallel to the plane of rotation of the impeller 17, this enables a high pressure buildup, e.g., by a radial fan. If the impeller 17 has an air intake direction that has at least one directional component along the axis of rotation 28 of the impeller 17, this enables an optimized, nondeflected air expulsion, such as is possible with radial fans. If the air delivery device 13 takes in air at least partly perpendicular to the axis of rotation of the impeller, but the air flows at least partly along the axis of rotation into the impeller, air can be taken in annularly and with large suction force from a plane to an air delivery device located in this plane. If the delivered air flow is expelled at least partly in the radial direction from the impeller, but flows out at least partly in the axial direction from the air delivery device, one can combine the axial outflow direction as in an axial fan and the high pressure of a radial fan.

Preferably, the air delivery device 13 has at least one deflecting device 31, 32, to change an air flow on its path between a through opening 40, 41 in the housing 30 and the impeller 17 at least in regard to its directional component directed along the axis of rotation. This enables the use of radial fans without having to deal with their design limitations.

Preferably, at least a first deflecting device 31 is provided to act on an air intake flow directed from an intake opening 40 of the housing 30 to the impeller 17, in order to deflect the air intake flow from an intake direction at the intake opening 40 oriented at least partly along a plane of rotation of the impeller 17 to an inlet direction in the impeller directed at least partly along the axis of rotation 28. In this way, instead of a pointlike intake at a round inlet opening one can realized a sheet like or annular suction within a plane. Looking along the axis of rotation 28 of the impeller 17 at one intake side of the impeller 17, this is preferably entirely concealed by the housing 30. Thus, in this case, the housing forms the first deflecting device 31.

Preferably at least one blowing opening 41 or at least one cross section through an air blowing strut 42 is arranged at least essentially in a plane through which the axis of rotation of the impeller passes. The intersection angle can be perpendicular or inclined at an angle other than 90°. Preferably, for this, a second deflecting device 32 is provided to act on an air blowing flow directed from the impeller 17 toward a blowing opening 41 in order to deflect the air blowing flow from an outlet direction from the impeller 17 oriented at least partly along the plane of rotation of the impeller 17 to a direction of motion having at least one directional component along the axis of rotation 28 of the impeller 17.

The blowing opening 41 traverses an angle section 51 amounting to less than 90° of the rotary motion of the impeller in relation to the axis of rotation of the impeller 17.

Preferably at least one intake opening 40 of the air delivery device extends by at least 90° about the impeller, or better 180°, or better 270° or more. Ideally, it subtends 360° and lets air pass through all around. The angle here refers to one revolution about the axis of rotation 28 of the impeller 17. Alternatively or additionally, a plurality of smaller intake openings 40 can also be provided in the mentioned region to draw air in here from the surroundings into the air delivery device 13. If at least one intake opening 40 and at least one blowing opening 41 are provided at least partly in different angle sections 51, 52 with regard to the axis of rotation 28 of the impeller 17 at the air delivery device 13, the efficiency of the air delivery device 13 is improved. It may be expedient for the flow supply to provide the intake opening 40 and the blowing opening 41 at least partly on different height levels with respect to the plane of rotation of the impeller 17, especially on different sides of the impeller.

Preferably, the air delivery device 13 has a separating device 33 which separates the air flow entering into the impeller 17 from the air flow expelled from the impeller. This separating device is formed, for example, by a wall in the housing that is situated perpendicular to the axis of rotation of the impeller. The separating device 33 has a circular through opening 34, whose diameter is only slightly smaller than the impeller 17 at its edge facing the intake side. The separating device is arranged at least in the region of its through opening 34 at the height of this edge, so as to use as much as possible the full height of the vanes for the expelling of air.

Preferably, one ventilation device 8 has at least one air directing device 10. The term "air directing device" means in particular a flat, level component that is permeable to air at least in one direction along its plane, preferably in at least two directions. This encourages a suctioning of air at a surface being climate controlled and a carrying it away via the air delivery device. It serves in particular to gather and distribute air. Especially suitable for this are spacer textiles, bubble wrap, knobbed foam, open-cell foam and the like. The air directing device 10 is preferably arranged at least partly in the plane of rotation of the impeller 17 or parallel to it. It is connected to at least one intake opening of the air delivery device 13, in order to transport air from the air collecting device 10 to the air delivery device 17.

In one embodiment of a seat cushion according to FIG. 4 it can be provided that the air delivery device 13 is arranged on the B side of the seat cushion turned away from the user. The air delivery device 13 here is preferably arranged inside an air directing device 11 arranged on the B side. Preferably, it lies roughly in the middle in regard to the base surface of the cushion. The direction of air expulsion is preferably radial to the air delivery device 13 along the B side of the cushion. In order to direct air to the A side, a transition device 12 is provided preferably at the edges of the cushion 3, e.g., in the form of channels and/or spacer textile beneath an upholstery 6. The transition device 12 connects the top and bottom air directing device 10, 11 on the A and B side of the cushion 3.

Preferably, the air conditioner 7 also has at least one return device 14, which connects the top air directing device 10 to the intake side of the air delivery device 13. For this, the air delivery device 13 preferably has at least one return inlet opening of its own, which is different from a main inlet opening of the air delivery device 13 and arranged preferably on a side of the air delivery device 13 facing away from this main inlet opening. In operation, air from the air delivery device 13 is thus delivered along the bottom air directing device via the transition device 12 into the top air directing device 10. Here, a portion of the air escapes through the upholstery 6 to cool or dehumidify the user. Excess air not escaping through the upholstery is brought back via the return device 14 to the air delivery device 13.

For many applications, the arrangement of FIG. 4 can also be operated in the opposite direction. However, an air conditioner 7 with suction action can also be created by means of the embodiment of FIG. 5 without return device 14.

It can be expedient to bring together in modular fashion an air delivery device 13 and an air directing device 10, 11, as shown in FIG. 6. For this, the air delivery device 13 is secured inside or on an air directing device 10, 11, for example. The air directing device 10, 11 can have, e.g., a spacer layer, such as one in the form of a spacer textile. The fastening can be produced by means of removable connection means such as screws and/or connection means such as gluing or welding.

If at least some of the vanes of an impeller have backward curved blades in regard to the direction of rotation of the impeller, this enables a much more quiet and vibration-free operation.

LIST OF REFERENCES 1 vehicle
2 climate control system
3 cushion
5 interior appointment
6 upholstery
7 air conditioner
8 ventilation device
10 air directing device on the A side
11 air directing device on the B side
12 transition device
13 air delivery device
14 return device
17 impeller
28 axis of rotation
30 housing
31 first deflecting device
32 second deflecting device
33 separating device
34 through opening
40 intake opening
41 blowing, opening
42 air blowing strut
51 first angle section
52 second angle section

The invention claimed is:
1. An air delivery device comprising:
   a) an impeller having a plane of rotation on a first plane; and
   b) a housing including:
      a. at least one air intake opening located at least partially along the first plane;
      b. at least one blowing opening located on the first plane;
      c. an impeller intake located on a second plane substantially parallel to the first plane; and
      d. at least one deflecting device extending between the first plane and the second plane to direct airflow in a direction from the at least one air intake opening to the impeller;
   wherein the direction of the airflow initially enters the intake opening on the first plane, is moved to the second plane by the at least one deflecting device into the impeller intake, moves through the impeller oriented at least partly along an axis of rotation of the impeller, and is directed out of the at least one blowing opening on the first plane.

2. The air delivery device according to claim 1, wherein the at least one deflecting device changes direction of air flow between a through opening in the housing and the impeller at least in regard to a directional component of the air flow along the axis of rotation of the impeller.

3. The air delivery device according to claim 2, wherein the at least one deflecting device acts on an intake flow of the air being directed from the at least one air intake opening of the housing to the impeller in order to deflect the intake flow of the air from the intake direction at the at least one air intake opening oriented at least partly along the plane of rotation of the impeller to the inlet direction in the impeller directed at least partly along the axis of rotation.

4. The air delivery device according to claim 3, wherein the at least one deflecting device is provided for acting on a blowing flow of the air directed from the impeller to the at least one blowing opening in order to deflect the blowing flow of the air from an exit direction from the impeller oriented at least partly along the plane of rotation of the impeller to a direction of motion having at least one directional component along the axis of rotation of the impeller.

5. The air delivery device according to claim 4, wherein the impeller is entirely covered by the housing when looking along the axis of rotation of the impeller at one intake side of the impeller.

6. The air delivery device according to claim 5, wherein the at least one intake opening of the air delivery device, or a plurality of smaller intake openings, extends around the impeller by an angle of at least 270° or more, the angle pertaining to one revolution about the axis of rotation of the impeller, to draw air into the air delivery device from a surrounding area.

7. The air delivery device according to claim 1, wherein the at least one deflecting device is provided for acting on a blowing flow of the air directed from the impeller to the at least one blowing opening in order to deflect the blowing flow of the air from an exit direction from the impeller, so that the air is oriented at least partly along the plane of rotation of the impeller to a direction of motion having at least one directional component along the axis of rotation of the impeller.

8. The air delivery device according to claim 1, wherein the impeller is entirely covered by the housing when looking along the axis of rotation of the impeller at one intake side of the impeller.

9. The air delivery device according to claim 8, wherein the at least one deflecting device covers the impeller.

10. The air delivery device according to claim 1, wherein the at least one blowing opening or at least one cross section through an air deflecting strut lie at least essentially in a plane through which the axis of rotation of the impeller passes.

11. The air delivery device according to claim 1, wherein the at least one intake opening of the air delivery device, or a plurality of smaller intake openings, extends around the impeller by an angle of at least 90°, the angle pertaining to one revolution about the axis of rotation of the impeller, to draw air into the air delivery device from a surrounding area.

12. The air delivery device according to claim 1, wherein the at least one intake opening and the at least one blowing opening are located at least partly in different angle sections with respect4 to the axis of rotation of the impeller of the air delivery device.

13. An air conditioner, wherein the air conditioner includes the air delivery device according to claim 1.

14. The air conditioner according to claim 13, wherein the air conditioner has at least one air directing device, which is arranged at least partly in the plane of rotation of the impeller or parallel to it, and which is connected to the at least one intake opening of the air delivery device, in order to transport air from the air directing device into the air delivery device.

15. A seat with the air delivery device according to claim 1.

16. A seat with the air delivery device according to claim 1, wherein a flow path of the air comprises:
   a) the air flowing into the at least one air intake opening oriented at least partly along the plane of rotation of the impeller;
   b) the air flowing into the impeller in the inlet direction parallel to the axis of rotation of the impeller; and
   c) the air flowing into the at least one blowing opening in an exit direction oriented at least partly along the plane of rotation of the impeller.

17. A vehicle with the air delivery device according to claim 1.

18. The air delivery device according to claim 1, wherein a flow path of the air comprises:
   a) essentially axial intake of the air into the impeller relative to the axis of rotation of the impeller; and
   b) essentially radial expulsion of the air from the impeller relative to the axis of rotation of the impeller.

19. The air delivery device according to claim 1, wherein a flow path of the air comprises:
   a) essentially radial intake of the air into the impeller relative to the axis of rotation of the impeller; and
   b) essentially axial expulsion of the air from the impeller relative to the axis of rotation of the impeller.

* * * * *

UNITED STATES PATENT AND TRADEMARK OFFICE
CERTIFICATE OF CORRECTION

Page 1 of 1

PATENT NO.       : 9,695,828 B2
APPLICATION NO.  : 13/948759
DATED            : July 4, 2017
INVENTOR(S)      : Winfried Helmenstein It is certified that error appears in the above-identified patent and that said Letters Patent is hereby corrected as shown below:

In the Claims

Column 7 Line 24, delete "respect4" and insert --respect--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*